Nov. 28, 1967    J. P. VOLLER    3,354,923
METHOD AND APPARATUS FOR STEMMING, CAPPING
AND CLEANING RAISINS
Filed Oct. 22, 1964
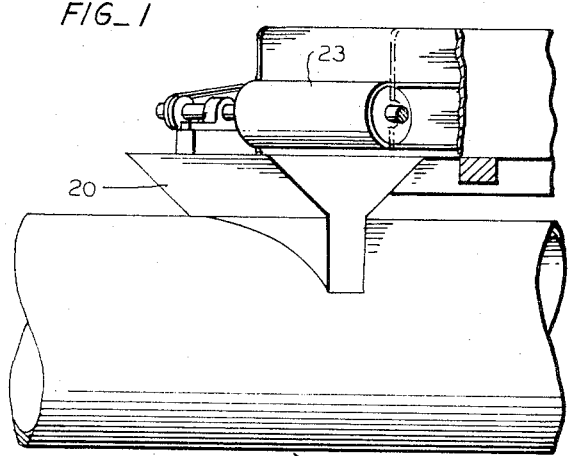
FIG_1
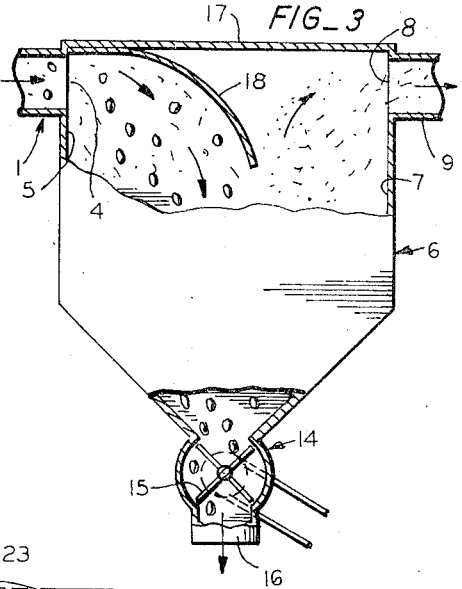
FIG_3
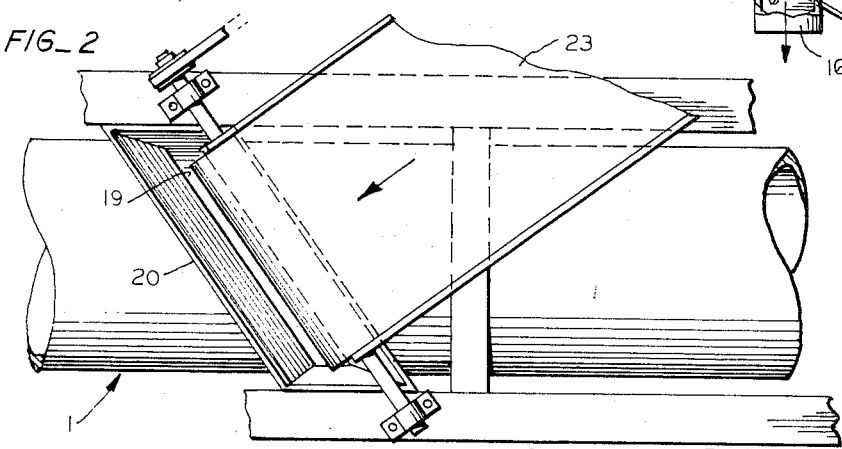
FIG_2
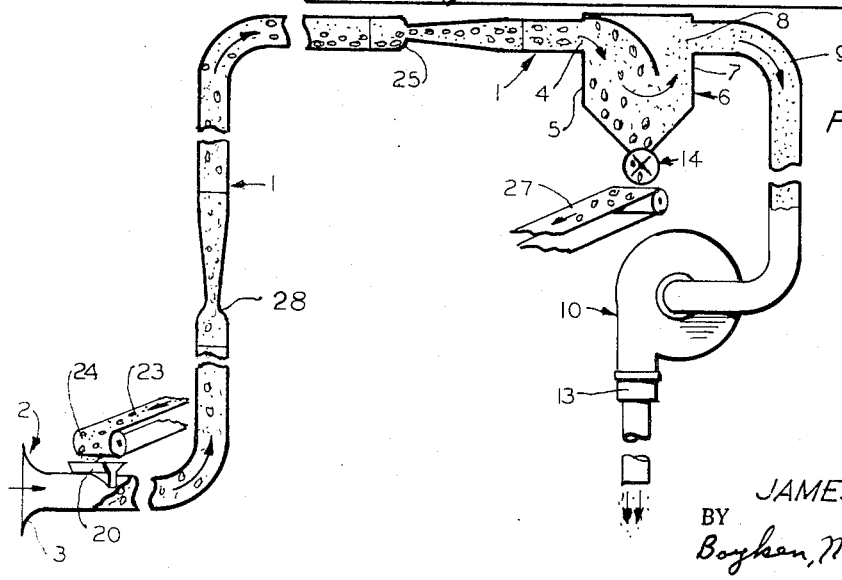
FIG_4
INVENTOR.
JAMES P. VOLLER
BY
Boyken, Mohler & Foster
ATTORNEYS

United States Patent Office 3,354,923
Patented Nov. 28, 1967

3,354,923
METHOD AND APPARATUS FOR STEMMING, CAPPING AND CLEANING RAISINS
James P. Voller, Fresno, Calif., assignor to Sun-Maid Raisin Growers of California, Fresno, Calif., a co-operative association of California
Filed Oct. 22, 1964, Ser. No. 405,803
7 Claims. (Cl. 146—222)

ABSTRACT OF THE DISCLOSURE

Apparatus and method by which unstemmed and uncapped raisins are carried in an air stream through a conduit in a manner in which the raisins are rubbed together during movement through the conduit to efficiently separate the caps and capstems from the raisins without injury to the raisins due to detrimental impact and abrasion with baffles, screens and the like.

---

This invention relates to a method and apparatus of cleaning and capstemming raisins, and has for one of its objects the provision of an improved method for more rapidly and efficiently removing the capstems and caps and undesirable solids from raisins to which they are attached or adhered, and for also removing loose solids from the raisins, than has heretofore been accomplished.

Another object of the invention is the provision of an improved method of removing the capstems and caps from raisins having the same attached thereto and for collecting the removed stems and caps separate from the raisins and which method does not injure the raisins.

A still further object of the invention is the provision of an improved method of removing the capstems, caps, chaff and foreign solids from raisins during conveyance of the raisins from one point to the other by rubbing the raisins together in air out of contact with moving mechanical parts, and collecting the capstems, caps, chaff and other light foreign material separate from the raisins.

An additional object of the invention is the provision of apparatus for carrying out the aforesaid objects, and another object is the provision of apparatus for more efficiently removing the caps and capstems from raisins than heretofore and at the same time conveying the raisins a relatively long distance.

Heretofore, after the main coarse stems have been removed from the raisins, it has been the practice to feed the raisins, including those having the caps and capstems thereon between the inner and outer conical surfaces of concentric cones, generally as seen in U.S. Patent No. 2,138,303, issued Nov. 29, 1938, to L. Kilner, and by which method and apparatus the caps and capstems may rupture the raisins or become imbedded in the latter, the uncapped raisins may pass through the machine without being affected, one way or the other, due to differences in the size of the raisins or the positions of the caps and capstems relative to the relatively moving opposed conical surfaces, or the fixed spacing between said surfaces, and other reasons. Also the volume processed per hour for each machine is relatively low for the raisins that are de-capped and de-stemmed.

By the present method the above objections to the conventional method are overcome and in addition the removed caps and capstems, dust and other relatively light foreign material are quickly and automatically collected separate from the raisins upon completion of the de-capping and de-stepping operation.

Other objects and advantages will appear in the description and drawings.

In the drawings FIG. 1 is a fragmentary side view of a portion of the apparatus that is schematically shown in FIG. 4 at the inlet or feed end thereof.

FIG. 2 is a top plan view of the portion shown in FIG. 1.

FIG. 3 is a fragmentary, part sectional and part elevational view of a portion of the apparatus schematically shown in FIG. 4, adjacent to the discharge end of the latter.

FIG. 4 is a schematic view of the apparatus for carrying out the method hereinafter described.

The apparatus shown in the drawings is illustrative of the invention and comprises a main elongated conduit generally designated 1, having an inlet 2 at one end thereof for air, the walls 3 (FIG. 4) of which inlet are flared outwardly. This conduit is of substantially uniform diameter from the inlet end thereof to the outlet 4 (FIGS. 3, 4), except as may hereafter be noted, and the outlet end of the conduit connects with sidewall 5 of the vertical sidewalls of the upper portion of a closed separator, compartment or trap generally designated 6.

Aligned with outlet 4 and formed in sidewall 7 that is opposite to the wall 5 is an opening 8 communicating with one end of pipe 9 which, in turn, may be of substantially the same diameter as the main conduit 1. The end of pipe 9 opposite to the opening 8 connects with the intake of a suction blower 10, and the outlet 13 of said suction blower may discharge into the air or to any suitable point.

The separator compartment 6 depends below the level of openings 4, 8 a substantial distance and the lower portions of the opposed sidewalls thereof may extend in convergently spaced relation at their lower ends for defining an outlet that opens into the upper end of a conventional rotary valve housing 14 having a rotary star wheel valve 15 which, upon rotation, discharges the clean raisins including large stems from the discharge opening 16 thereof while maintaining a substantial air seal against outside air at atmospheric pressure entering the trap or collector 6. The rotor of valve 15 may be actuated by any desired source of power.

The suction blower 10 will remove the capstems, caps and light foreign material from the collector 6.

Within the upper portion of separator 6 and extending from the top wall 17 thereof at a point above the outlet 4 in an arcuate downward direction is a baffle plate 18. The concave side of said plate 18 generally faces sidewall 5 and its lower edge terminates at a point intermediate walls 5, 7 and spaced below the level of the outlet 4 and opening 8. Thus the raisins drawn into the collector 6 will be deflected downwardly toward valve 15 while the lighter material will be carried past said lower edge and to opening 8.

Referring to FIGS. 1, 2 and 4, the conduit 1 extends horizontally from the flared inlet 2, and formed in the upper side thereof is an upwardly opening, relatively narrow slot 19 that extends diagonally across the conduit from axially displaced points that are diametrically opposite to each other at opposite sides of the conduit. Slot 19 is adjacent to the inlet 2, and a feed hopper 20 extends upwardly from the edges of said slot and from the ends thereof for receiving raisins and any foreign material that may be carried thereto on feeder 23 that is preferably a conveyor belt, the width of which is preferably at least equal to the length of slot 19 and which extends at a right angle to said length for feeding a curtain 24 (FIG. 4) of raisins into the conduit 1 through the slot 19. This curtain or layer of raisins includes the raisins having the caps and capstems attached thereto, and dust and dirt that may be adhered to said raisins.

This curtain 24 of raisins will maintain the slot 19 closed to a substantial degree, and the suction in conduit 1 will prevent any clogging of the slot, since the raisins at the slot are quickly drawn into the conduit.

The raisins so drawn into the slot 19 are preferably conditioned to be at a temperature of approximately 50° F. which may be done by any suitable means such as moving the loaded upper run of the feeder belt 23 through a cooling chamber. Normally the temperature of the raisins is appreciably higher. By reducing the temperature of the raisins to approximately 50° F., the fruit heretofore most difficult to cap, such as fruit of relatively low mass and relatively low sugar content may be stemmed and capped by the present method, as well as soft and normal fruit.

The feeding of the raisins in a curtain or layer that extends from side to side of the conduit is important, as distinguished from merely feeding the raisins into the conduit at a central point, inasmuch as by the present method all raisins entering the conduit are equally subjected to the full effect of all of the moving air rather than the air being shunted to the sides of the mass of raisins entering the conduit.

As an example of a satisfactory installation in a conduit that is twenty inches in diameter, the velocity of the air in said conduit is approximately six thousand feet per minute, and as a result, there is a substantial turbulance in said air and the raisins will be carried substantially in the center of the air stream and momentum will be imparted to the individual berries at different rates proportional to the mass of each with the result that they accelerate at different rates of speed, and will rub together in the air stream, thereby separating the stems and capstems from the raisins. The mass of a raisin is a function primarily of its sugar content and moisture, hence each will have a different mass.

It has been found that a velocity of approximately 6,000 feet per minute is the minimum velocity that will carry the raisins in the center of the pipe, and inasmuch as the raisins will ultimately settle a horizontally extending run at some point in the pipe, the velocity essential to bringing the raisins back to the center of the pipe may be effected by installing one or more venturis 25 in the conduit, according to the distance the raisins are to be carried.

At least one venturi 28 may be positioned in the vertical run of the pipe (FIG. 4) which venturi is similar to venturi 25. This accelerates the material in the vertical run of the pipe and materially contributes to better capping of the raisins. Thus, in the example shown, the venturi in the vertically extending run of the pipe causes an effect that not only contributes to the capping of the raisins but moving the raisins upwardly to the horizontally extending run where the other venturi performs the added function of carrying the raisins back into the center of the air stream.

Other factors, such as bends in the conduit and vertical sections of the conduit, may determine the spacing of the venturi relative to the inlet or the member and relative spacing between venturis where more than one may be used.

In FIG. 4 where the velocity of the air in the pipe is 6,000 feet per minute and the venturi 25 is positioned approximatly at the point where the raisins 26 would tend to settle, the venturi is such that the velocity at its throat will be approximately twelve thousand feet per minute and the potential energy will be changed into kinetic energy with the result that the raisins are brought back into the center of the stream. This momentary concentration of the raisins at the increased velocity also results in better separation of capstems and raisins. For this reason, a venturi is preferably positioned in the conduit, even if the distance between the inlet and outlet of the conduit were such that the raisins would be carried to the outlet in approximately the center of the stream.

The actual separation of the stems and capstems from the raisins is due to the rubbing of the raisins together in the air stream, and to the fact that sufficient raisins are fed into the conduit and air stream to be brought into engagement with each other. Once in the stream, the differences in the velocities of the different individual raisins due to their respective mass differences causes the abrading of the raisins that loosens and separates the stems and caps from the raisins. Obviously dirt adhered to the raisins is also loosened and is separated from the raisins.

Upon the raisins, capstems, dust, etc., being ejected into the separator 6, the raisins will be deflected downwardly by baffle 18 while the capstems, dust and other similar lighter weight foreign material will be carried upwardly after passing the lower edge of the baffle 18 and will be carried through the suction blower for discharge from outlet 13 thereof.

The raisins, and large stems, on the other hand, will be discharged at valve 14 onto a conveyor belt 27 or any other suitable means.

It should be noted that the introduction of the raisins into said conduit in the form of a curtain extending diagonally across the conduit results in improved stemming and capping in that a greater concentration of raisins may be introduced in to said air stream and more readily picked up by the air stream for faster and more efficient capping and stemming than were the curtain thicker and positioned squarely across the air stream.

The method above described may broadly be described as one in which raisins are stemmed and capped by moving the unstemmed and uncapped raisins one against the other in and under the influence of moving air until the caps and capstems have been abraded from the raisins, and then collecting the raisins separate from the stems and capstems.

It is to be understood that different modifications in the apparatus may be made without departing from the spirit of the invention and the scope of the appended claims.

I claim:

1. The method of stemming and capping raisins of different individual masses that includes the steps of:
  (a) moving an air stream generally in one direction within and enclosed path of travel from an inlet to an outlet;
  (b) carrying said raisins in said one direction in approximately the central portion of said air stream substantially free from physical support; and,
  (c) rubbing the raisins of adjacent pairs thereof together for a sufficient time to loosen and free said capstems and caps therefrom; and then
  (d) collecting said raisins free from said capstems and stems after separation of said capstems and stems from said raisins.

2. The method of stemming and capping raisins of a body, and which raisins are of different individual masses that includes the steps of:
  (a) moving a stream of air within an enclosed, generally horizontally extending path of travel, longitudinally of said path and at a velocity sufficient to produce a substantial turbulence of said air within said path and within the central portion of the latter;
  (b) supporting said raisins within said central portion and moving them along said path under the sole influence of said air at different velocities proportioned to said masses, and with the raisins of adjacent pairs thereof of different individual masses in contact with each other and substantially free from impact against stationary solid material to thereby abrade said caps and capstems from said raisins without injury to the raisins due to said impact.

3. The method as defined in claim 2 that includes the step of:
  (c) accelerating the velocity of said raisins at a point in said path and at the same time more closely concentrating the body of raisins in said path at said point and within the central portion of said path to thereby increase the abrading action on said caps and capstems at said point.

4. The method as defined in claim 2 that includes the step of:
  (c) said raisins being introduced into said air stream across substantially the full width of the latter in a relatively thin curtain or layer of substantially uniform thickness extending diagonally across said air stream whereby each of said raisins so introduced will be subjected to air of the same velocity.

5. Apparatus for stemming and capping raisins that comprises:
  (a) an elongated conduit having an inlet at one end and an outlet at the opposite end;
  (b) suction means in communication with said outlet for inducing a flow of air into said inlet and through said conduit toward said outlet at a velocity sufficient to support and carry said raisins from said inlet to said outlet;
  (c) said conduit including a horizontally disposed end portion at and extending generally toward said opposite end, and said one end being open to provide said inlet with said end portion being formed with an upwardly opening slot extendng transversely of said conduit for passing therethrough a layer of raisins of substantially uniform thickness and of a width substantially equal to the length of said slot into said portion of conduit, and means for supplying such layer to said slot for falling by gravity through the latter into said portion of said conduit;
  (d) said conduit including collecting means therein at the end thereof adjacent to said suction means for cellecting the raisins separate from the caps and stems that have been removed from said raisins.

6. Apparatus as defined in claim 5:
  (e) said conduit including a venturi thereon coaxial therewith for accelerating the velocity of said air at the throat of said venturi and for reducing the diameter of said conduit to thereby concentrate the flow of raisins at said throat relative to the dispersion thereof in said conduit at opposite ends of said venturi and position said raisins in the central portion of said conduit at the end of the latter that is nearest to said collector;
  (f) said slot being of substantially uniform width and extending obliquely across said portion of said conduit from substantially one side thereof to the other whereby a layer of raisins of a width substantially equal to the length of said slot will substantially extend from side to side of said conduit upon being supplied to said slot for falling therethrough.

7. Apparatus for stemming and capping raisins that comprises:
  (a) an elongated conduit having an inlet at one end and an outlet at the opposite end;
  (b) suction means in communication with said outlet for inducing a flow of air into said inlet and through said conduit toward said outlet at a velocity of approximately 6,000 feet per minute;
  (c) means for discharging unstemmed and uncapped raisins into said conduit adjacent to said inlet in the form of a layer of substantial uniform thickness extending across said conduit from one side to the other;
  (d) said conduit including collecting means therein at the end thereof adjacent to said suction means for collecting the raisins separate from the caps and stems that have been removed from said raisins;
  (e) said conduit including a venturi thereon coaxial therewith for accelerating the velocity of said air to approximately 12,000 feet per minute at the throat of said venturi and for reducing the diameter of said conduit to thereby concentrate the flow of raisins at said throat relative to the dispersion thereof in said conduit at opposite ends of said venturi and position said raisins in the central portion of said conduit at the end of the latter that is nearest to said collector;
  (f) said conduit including a horizontally extending section adjacent to said collecting means and remote from said inlet and said venturi being positioned in said section;
  (g) said conduit further including a vertically extending section between said inlet and said horizontally extending section, and a second venturi positioned in said vertical section for accelerating the movement of said raisins to said horizontally extending section and to effect the capping of raisins in said vertical section.

References Cited

UNITED STATES PATENTS

| | | | |
|---|---|---|---|
| 611,782 | 10/1898 | Forsyth | 146—55 X |
| 1,234,697 | 7/1917 | Foote | 146—55 |
| 2,446,646 | 8/1948 | Forrest | 146—55 |
| 2,508,728 | 5/1950 | Stansbury | 146—55 X |
| 2,620,841 | 12/1952 | Jacobson | 146—221.7 |
| 2,759,511 | 8/1956 | Jacobson | 146—221.7 X |

WILLIAM W. DYER, JR., *Primary Examiner.*

W. GRAYDON ABERCROMBIE, *Examiner.*